(12) United States Patent
Achenbach et al.

(10) Patent No.: US 9,471,326 B2
(45) Date of Patent: Oct. 18, 2016

(54) METHOD AND APPARATUS FOR DIFFERENTIAL CHECKPOINTING

(71) Applicant: Advanced Micro Devices, Inc., Sunnyvale, CA (US)

(72) Inventors: Michael Achenbach, Austin, TX (US); Francesco Spadini, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 542 days.

(21) Appl. No.: 13/944,293

(22) Filed: Jul. 17, 2013

(65) Prior Publication Data
US 2015/0026437 A1 Jan. 22, 2015

(51) Int. Cl.
*G06F 9/00* (2006.01)
*G06F 9/38* (2006.01)

(52) U.S. Cl.
CPC ............ *G06F 9/3863* (2013.01); *G06F 9/384* (2013.01)

(58) Field of Classification Search
CPC .................... G06F 9/3863; G06F 9/384
See application file for complete search history.

(56) References Cited

U.S. PATENT DOCUMENTS

| | | |
|---|---|---|
| 5,930,491 A | 7/1999 | Hilgendorf |
| 6,308,260 B1 | 10/2001 | Le |
| 2003/0061467 A1 | 3/2003 | Yeh |
| 2004/0123077 A1 | 6/2004 | Shebanow |
| 2005/0120192 A1 | 6/2005 | Akkary |
| 2010/0250900 A1 | 9/2010 | Brown |
| 2010/0257341 A1 | 10/2010 | Brown |
| 2013/0042089 A1 | 2/2013 | Vinh |
| 2013/0339679 A1 | 12/2013 | Iyer |
| 2014/0040595 A1* | 2/2014 | Tran ................ G06F 9/384 712/32 |

OTHER PUBLICATIONS

U.S. Appl. No. 13/944,302, filed Jul. 17, 2013, entitled "Hybrid Tag Scheduler".
Non-Final Office Action mailed Dec. 17, 2015 for U.S. Appl. No. 13/944,302, 24 pages.
Final Office Action mailed Apr. 21, 2016 for U.S. Appl. No. 13/944,302, 17 pages.

* cited by examiner

*Primary Examiner* — Zachary K Huson

(57) ABSTRACT

A processor core stores information that maps a physical register to an architectural register in response to an instruction modifying the architectural register. The processor recovers a checkpointed state of a set of architectural registers prior to modification of the architectural register by the instruction by modifying a reference mapping of physical registers to the set of architectural registers using the stored information.

20 Claims, 8 Drawing Sheets

METHOD AND APPARATUS FOR DIFFERENTIAL CHECKPOINTING

FIELD OF THE DISCLOSURE

This application relates generally to processing systems, and, more particularly, to differential checkpointing in processing systems.

BACKGROUND

The architectural state of a processing unit at any given time is represented by the values of a set of architectural registers. Each architectural register can be mapped to a physical register that stores the value for the architectural register, e.g., using a map of the relationships between architectural register numbers and physical register numbers. The value of the architectural register can be read out of the corresponding physical register or it can be modified by modifying the value in the corresponding physical register. Each instruction processed by the processing unit can therefore modify the architectural state of the machine. The architectural state of the processing unit may be checkpointed at selected times by writing identifiers of the memory locations that store data for the set of architectural registers to another memory location, such as a RAM. The checkpointed values can subsequently be written back from memory to the physical registers that correspond to the set of architectural registers, e.g., if the processing unit chose the wrong speculative path following a branch instruction and the architectural state of the processing unit needs to be rolled back to the checkpointed state. However, the amount of memory needed to checkpoint the set of architectural registers may consume a significant amount of area and/or power, depending on the number of architectural registers and the amount of information stored in each architectural register.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
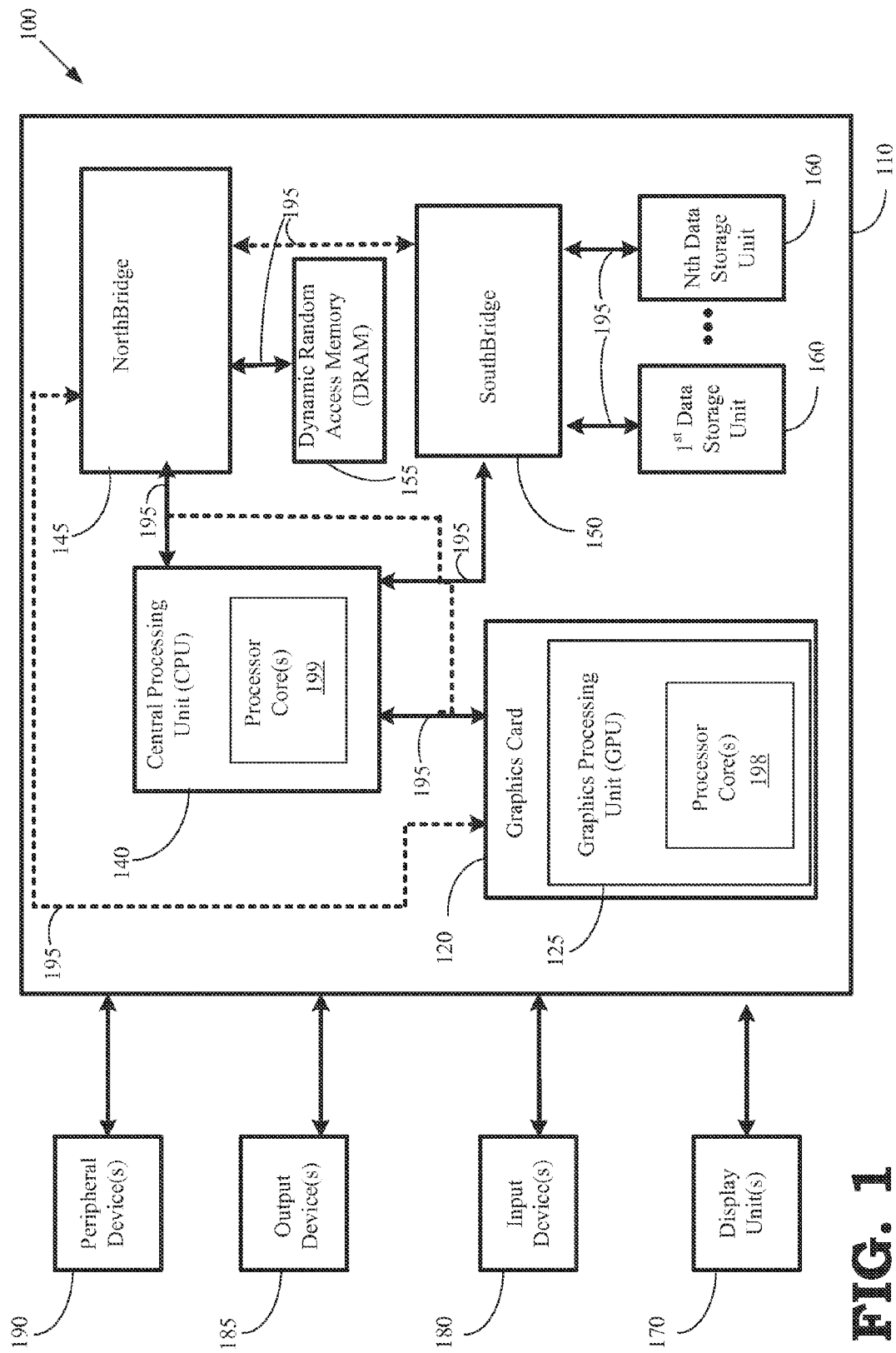
FIG. 1 is a block diagram of a computer system, according to some embodiments.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

FIGS. 1-9 illustrate embodiments of differential checkpointing techniques that reduce the power consumption and area required to checkpoint the architectural state of a processing unit by only checkpointing changes to the architectural state as they occur. The architectural state of the processing unit may be represented by a mapping of a set of architectural registers to physical registers. Some embodiments may store the changes to the architectural state generated by each instruction in a differential checkpoint array. Information stored in the differential checkpoint array may then be used to modify a reference architectural state to recover the architectural state of the set of architectural registers prior to a first mis-speculated instruction after a branch instruction. Thus, in some embodiments, information identifying a physical register associated with an architectural register is stored in the differential checkpoint array in response to an instruction modifying the architectural register. Each entry in the differential checkpoint array represents an encoded value that identifies the architectural register that has been modified and an associated physical register entry. For example, entries in the array may be indexed by architectural register numbers (ARNs) so that each entry in the array corresponds to an architectural register. Entries in the array may include physical register numbers (PRNs) that identify the physical register corresponding to the ARN associated with that entry.

Some embodiments may use the current mapping of the set of architectural registers to physical registers as the reference architectural state, the state after modification by the instruction. The stored information in these embodiments identifies a physical register associated with the architectural register prior to modification by the instruction. Other embodiments may use a previous mapping of the set of architectural registers to physical registers as the reference set of architectural registers. The stored information in these embodiments identifies a physical register associated with the architectural register after modification by the instruction. The checkpointed state of the set of architectural registers prior to modification by a plurality of instructions may be recovered by storing information identifying the physical registers associated with the architectural registers modified by the plurality of instructions and then modifying the reference set of architectural registers using the oldest or youngest modification of each architectural register.

FIG. 1 illustrates an example processing system 100, according to some embodiments. The computer system 100 may be a personal computer, a computing-enabled television, a laptop computer, a handheld computer, a netbook computer, a mobile device, a tablet computer, a computing-enabled cellular telephone, a personal data assistant (PDA), a server, a mainframe, a work terminal, or the like. The computer system 100 includes a main structure 110 which may include a motherboard, system-on-a-chip, circuit board or printed circuit board, a desktop computer enclosure or tower, a laptop computer base, a server enclosure, part of a mobile device, tablet, personal data assistant (PDA), or the like.

Some embodiments of the main structure 110 include a graphics card 120, which may contain a graphics processing unit (GPU) 125 used in processing graphics data. The computer system 100 shown in FIG. 1 also includes a central processing unit (CPU) 140 or other type of processor, which is coupled to a northbridge 145. Some embodiments of the graphics card 120 may be coupled to the CPU 140 via the northbridge 145 or some other electromagnetic or communicative connection. The northbridge 145 may be coupled to a system RAM 155 (e.g., DRAM) and in some embodiments the system RAM 155 may be coupled directly to the CPU 140. The system RAM 155 may be of any RAM type known in the art and the type of RAM 155 may be a matter of design choice. In some embodiments, the northbridge 145 may be connected to a southbridge 150, which may be connected to one or more data storage units 160. In one or more embodiments, the various components of the computer system 100 may be operatively, electromagnetically, or physically connected or linked with a bus 195 or more than one bus 195. Some embodiments of the computer system 100 may be connected to one or more display units 170, input devices 180, output devices 185, or peripheral devices 190.

The GPU 120 and the CPU 140 shown in FIG. 1 may implement one or more processor cores 198, 199, respectively, for executing instructions. Some embodiments of the GPU 120 or the CPU 140 may implement four or more processor cores 198, 199 for processing four or more instructions in parallel. However, persons of ordinary skill in the art having benefit of the present disclosure should appreciate that the number of processor cores implemented in the CPU 120 or the CPU 140 is a matter of design choice. As discussed herein, the processor cores 198, 199 employ differential checkpointing of the architectural state of the processor core 198, 199 whereby changes to the architectural state are checkpointed (stored) as they occur, e.g., in response to an instruction being dispatched. Thus, in some embodiments the processor cores 198, 199 store information identifying a physical register associated with an architectural register in response to an instruction modifying the architectural register. For example, an array may be used to record the changes to the architectural state caused by each instruction as it is dispatched. The changes recorded in the array may then be used to roll back a speculative state of the processor cores 198, 199 to the checkpoint, e.g., by using the recorded changes to return the modified architectural registers to their previous state.

Figure 2:
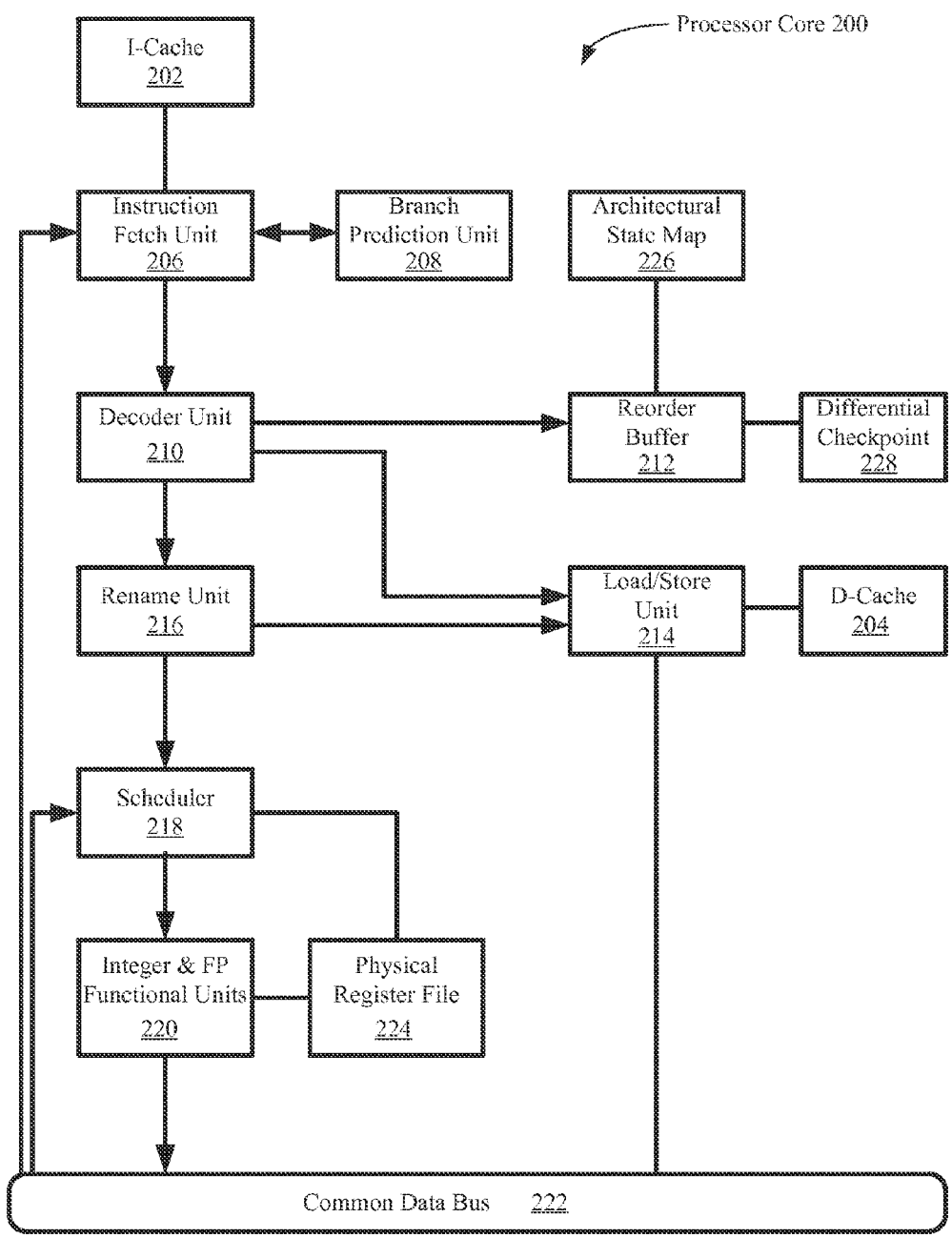
FIG. 2 is a block diagram of a processor core of FIG. 1, according to some embodiments.

FIG. 2 illustrates an example of a processor core 200 that may be used to implement processor cores 198, 199 shown in FIG. 1, according to some embodiments. Processor core 200 may include circuitry for executing instructions according to a predefined instruction set. The processor core 200 may be implemented in a single-processor configuration or in a multi-processor configuration. Some embodiments of the processor core 200 may be included in a multi-core configuration within a processing node of a multi-node system.

An instruction-cache (I-cache) 202 may store instructions for a software application and a data-cache (D-cache) 204 may store data used in computations performed by the instructions. In some instances, the I-cache 202 and the D-cache 204 may be implemented together as a unified cache or as a hierarchy of caches such as L1 and L2 cache structures. The processor core 200 includes an instruction fetch unit (IFU) 206 for fetching one or more instructions from the I-cache 202 per clock cycle. The IFU 206 may include a program counter (PC) register that holds a pointer to an address of the next instructions to fetch from the I-cache 202. A branch prediction unit 208 may be coupled to the IFU 206 and the branch prediction unit 208 may be configured to predict a branch or path taken following instructions that change the flow of an instruction stream, e.g., branch instructions.

A decoder unit 210 implemented in the processor core 200 decodes the opcodes of the fetched instructions. Some embodiments of the decoder unit 210 may divide a single instruction into two or more micro-operations (micro-ops). The micro-ops may be processed by subsequent pipeline stages and executed out-of-order. However, the micro-ops may not be committed until each micro-op corresponding to an original instruction is ready. As used herein, the processing of an "instruction" in the processor core 200 may refer to the processing of the instruction as whole or the processing of an individual micro-op comprised within the instruction. The decoder unit 210 may allocate entries in an in-order retirement queue, such as reorder buffer 212, in reservation stations, or in a load/store unit 214. In the embodiment shown, a reservation station may comprise the rename unit 216 and the scheduler 218, which are shown as separate units. The flow of instructions from the decoder unit 210 to the allocation of entries in the rename unit 216 may be referred to as dispatch. The rename unit 216 may be configured to perform register renaming for the fetched instructions.

Register renaming may facilitate the elimination of certain dependencies between instructions (e.g., write-after-read or "false" dependencies), which may in turn prevent unnecessary serialization of instruction execution. In one embodiment, rename unit 216 may be configured to rename the architectural destination registers specified by instructions by mapping them to a physical register space, resolving false dependencies in the process. In some embodiments, rename unit 216 may maintain mapping tables that reflect the relationship between architectural registers and the physical registers to which they are mapped.

Once decoded and renamed, instructions may be ready to be scheduled for execution. The scheduler 218 may act as an instruction queue where instructions are stored in entries to wait until their operands become available. When operands are available and hardware resources are also available, an instruction may be issued from the scheduler 218 to the integer and floating-point functional units 220 or the load/store unit 214. The functional units 220 may include arithmetic logic units (ALUs) for computational calculations such as addition, subtraction, multiplication, division, and square root. Logic may be included to determine an outcome of a branch instruction and to compare the calculated outcome with the predicted value. If there is not a match, a mis-prediction or mis-speculation occurred, and the subsequent instructions after the branch instruction need to be removed and a new fetch with the correct PC value needs to be performed. The process of removing the results of instructions subsequent to the branch instruction and returning the state of the processor core 200 to its state after execution of the branch instruction may be referred to as "unrolling" or "rolling back" the state of the processor core 200, as discussed herein.

Results from the functional units 220 or the load/store unit 214 may be presented on a common data bus 222. The results may be sent to the reorder buffer 212 where the action receives its results and may be marked for retirement. Instructions at the head-of-the-queue may have their results written to the appropriate physical registers in a physical register file 224. The processor core 200 may also include an architectural state map 226 that maps the architectural register numbers to the associated physical register numbers that indicate the physical registers in the physical register file 224. The architectural state of the general-purpose registers of processor core 200 may therefore be represented by the architectural state map 226 and the contents of the physical register file 224. Instructions in the reorder buffer 212 may be retired in-order and the head-of-queue pointer may be adjusted to the subsequent instruction in program order as each instruction is retired.

As discussed herein, the state of the processor core 200 that is represented by the architectural state map 226 may represent a speculative state of the processor core 200, e.g., the state of the processor core following speculative execution of instructions following a branch instruction. If the branch prediction unit 208 correctly predicted the branch taken by the branch instruction, the speculative state may become the actual state of the processor core 200. However, if the branch prediction unit 208 incorrectly predicted the branch taken by the branch instruction, the speculative state may represent an incorrect state of the processor core 200 following the branch instruction. The processor core 200 therefore implements a differential checkpoint unit that stores information indicating modifications to the mapping of architectural registers to physical registers caused by instructions executed following the branch instruction.

Figure 3:
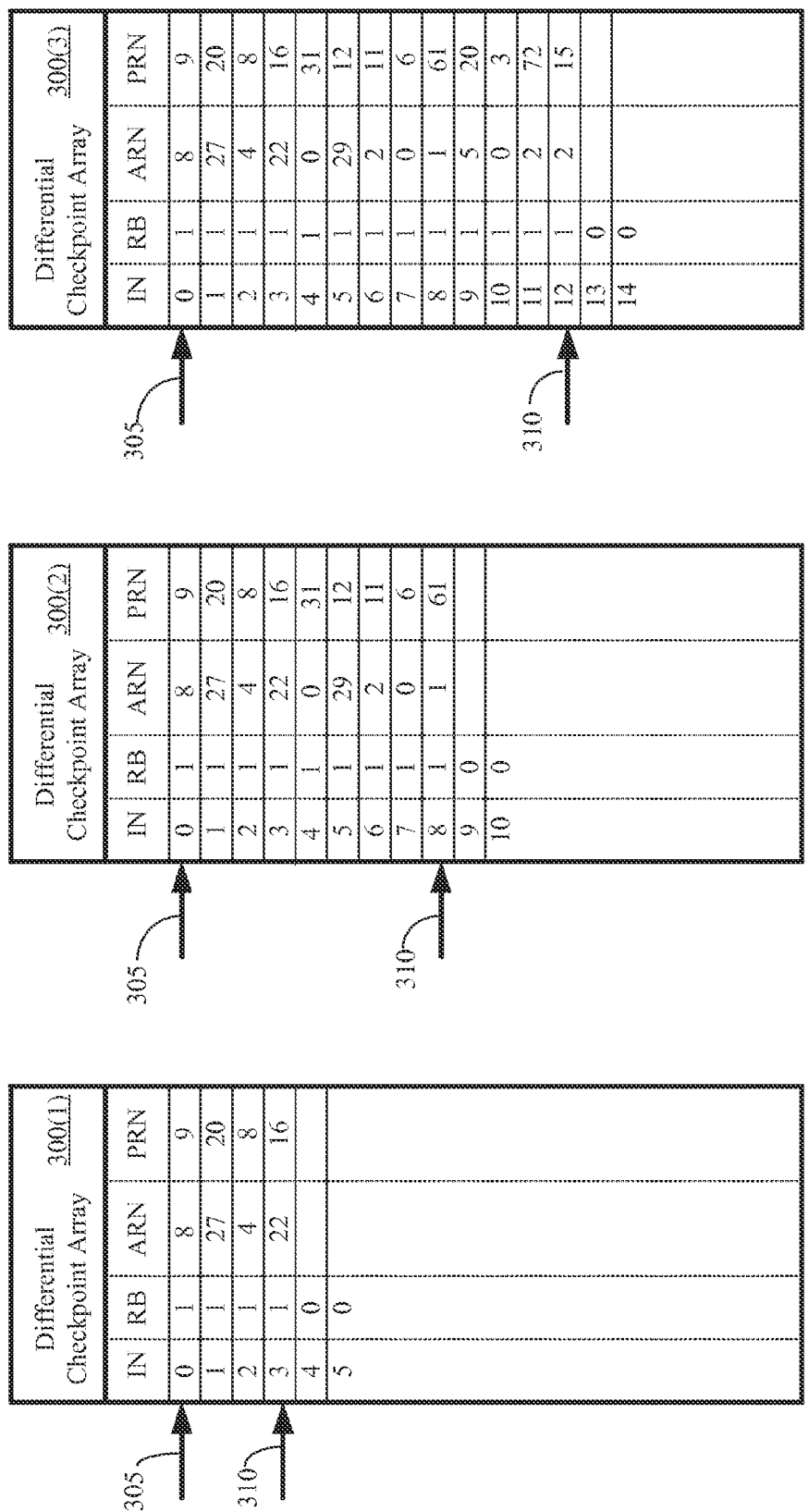
FIG. 3 is a diagram of a differential checkpoint array at three different instances in time, according to some embodiments.

FIG. 3 illustrates a differential checkpoint array 300 at three different instances in time, according to some embodiments. The differential checkpoint array 300 may be implemented in the differential checkpoint unit 228 shown in FIG. 2 and may include information that can be used to unroll or roll back the architectural state of the machine from the current speculative state to the state prior to executing the instructions included in the differential checkpoint array 300. Some embodiments of the differential checkpoint array 300 may be implemented as an array that is attached and linked to a reorder buffer such as the reorder buffer 212 shown in FIG. 2. Entries in the differential checkpoint array 300 may therefore be modified by each instruction that allocates to the reorder buffer. Entries in the reorder buffer may therefore track the architectural destinations and associated physical register values for the instructions. The differential checkpoint array 300 and the reorder buffer may therefore use the same dispatch (write) pointer and retire (read/deallocate) pointer and the reorder buffer may guarantee that the differential checkpoint array 300 does not overflow. Other embodiments of the differential checkpoint array 300 may be implemented as an independent, age-ordered, rotating queue with its own read/write pointer. The differential checkpoint array 300 may therefore include a mechanism to ensure that this buffer does not overflow, e.g., a stalling mechanism such as token counting. The size of this buffer can be set to optimize performance or power/area.

Entries in the differential checkpoint array 300 may include an instruction number (IN), a rollback vector (RB) indicating whether the modifications caused by this instruction are to be rolled back in the event of a flush, an architectural register number (ARN) modified by the instruction, and a physical register number (PRN) that was associated with the architectural register number before the instruction modified the architectural register. In some embodiments, the rollback vector (RB) may be calculated when needed and so the differential checkpoint array 300 may not include explicit storage for the rollback vector (RB). The embodiment depicted in FIG. 1 may therefore be used to roll back the architectural state of the processor core from the current speculative state to the state prior to executing the instructions included in the differential checkpoint array 300. As discussed herein, persons of ordinary skill in the art having benefit of the present disclosure should appreciate that other embodiments of the differential checkpoint array 300 may instead store the PRN associated with the ARN following modification of the architectural register by the instruction. These embodiments of the differential checkpoint array 300 may therefore be used to recover the architectural state of the processor core beginning with a previously retired architectural state of the processor core. The information in the differential checkpoint array 300 can be used to reproduce the changes to the previous retired architectural state and thereby recover the state prior to beginning speculative execution of instructions.

The differential checkpoint array 300(1) shows the differential changes to the architectural state caused by instructions 0-3. A flush pointer 305 points to instruction 0 to indicate that this instruction is a branch instruction. In the event that a branch prediction unit begins speculatively dispatching instructions down an incorrect branch of the program flow, the mis-speculated instructions may subsequently be flushed from the pipeline back to the instruction indicated by the flush pointer 305. A dispatch pointer 310 points to instruction 3 to indicate that instruction 3 is the most recently dispatched instruction. In some embodiments, upon execution of a branch that mis-predicts, the rollback vector (RB) may be calculated based on the branch's location (indicated by the flush pointer 305) and the retire pointer or dispatch pointer 310, depending on the direction one unrolls. Some embodiments may include explicit storage for the rollback vector (RB). In that case, bits for the instructions 0-3 may be set to 1 to indicate that these instructions should be rolled back if necessary, e.g., in the event of a mis-speculation. The bits for instructions 4-5 may be set to 0 to indicate that these instructions have not yet changed the architectural state and do not need to be rolled back. However, instructions 4-5 may subsequently change the architectural state, as indicated in the differential checkpoint array 300(2). The differential checkpoint array 300(1) indicates that prior to execution of instruction 0 the architectural register 8 was mapped to the physical register number 9, prior to execution of instruction 1 the architectural register 27 was mapped to the physical register number 20, prior to execution of instruction 2 the architectural register 4 was mapped to the physical register number 8, and prior to execution of instruction 3 the architectural register 22 was mapped to the physical register number 16.

The differential checkpoint array 300(2) shows the differential changes to the architectural state after instruction 3 caused by instructions 4-8. The flush pointer 305 points to instruction 0 and the dispatch pointer 310 has moved ahead to point to instruction 8 to indicate that instruction 8 is the most recently dispatched instruction. The bits (RB) for the instructions 0-8 are set to 1 to indicate that these instructions should be rolled back if necessary, e.g., in the event of a mis-speculation. The bits for instructions 9-10 are set to 0 to indicate that these instructions have not yet changed the architectural state and do not need to be rolled back. The differential checkpoint array 300(2) indicates that prior to execution of instruction 4 the architectural register 0 was mapped to the physical register number 31, prior to execution of instruction 5 the architectural register 29 was mapped to the physical register number 12, prior to execution of instruction 6 the architectural register 2 was mapped to the physical register number 11, prior to execution of instruction 7 the architectural register 0 was mapped to the physical register number 6, and prior to execution of instruction 8 the architectural register 1 was mapped to the physical register number 61.

The differential checkpoint array 300(3) shows the differential changes to the architectural state after instruction 8 caused by instructions 9-12. The flush pointer 305 points to instruction 0 and the dispatch pointer 310 has moved ahead to point to instruction 12 to indicate that instruction 12 is the most recently dispatched instruction. The bits (RB) for the instructions 0-12 are set to 1 to indicate that these instructions should be rolled back if necessary, e.g., in the event of a mis-speculation. The bits for instructions 13-14 are set to 0 to indicate that these instructions have not yet changed the architectural state and do not need to be rolled back. The differential checkpoint array 300(3) indicates that prior to execution of instruction 9 the architectural register 5 was mapped to the physical register number 20, prior to execution of instruction 10 the architectural register 0 was mapped to the physical register number 3, prior to execution of instruction 11 the architectural register 2 was mapped to the physical register number 72, and prior to execution of instruction 12 the architectural register 2 was mapped to the physical register number 15.

The differential checkpoint array 300 may therefore be used to roll back the state of the machine to the state prior to any of instructions 0-12. For example, if a mis-speculation is detected following modification of the differential checkpoint array 300(1) by instruction 3, the state of the machine may be rolled back from the state following instruction 3 to the state prior to branch instruction 0 by undoing each of the individual changes caused by instructions 0-3, e.g., as indicated by the state of the differential checkpoint array 300(1). For another example, the state of the machine may be rolled back from the state following instruction 12 to the state prior to branch instruction 0 by undoing each of the individual changes caused by instructions 0-12, as indicated by the state of the differential checkpoint array 300(3). Differential checkpointing may therefore require less area and consume less power than a conventional checkpointing technique that checkpoints the state of the architectural registers by writing the complete mapping of a full set of architectural registers to RAM and that recovers the state of the architectural registers by reading the complete mapping of the full set of architectural registers.

Figure 4:
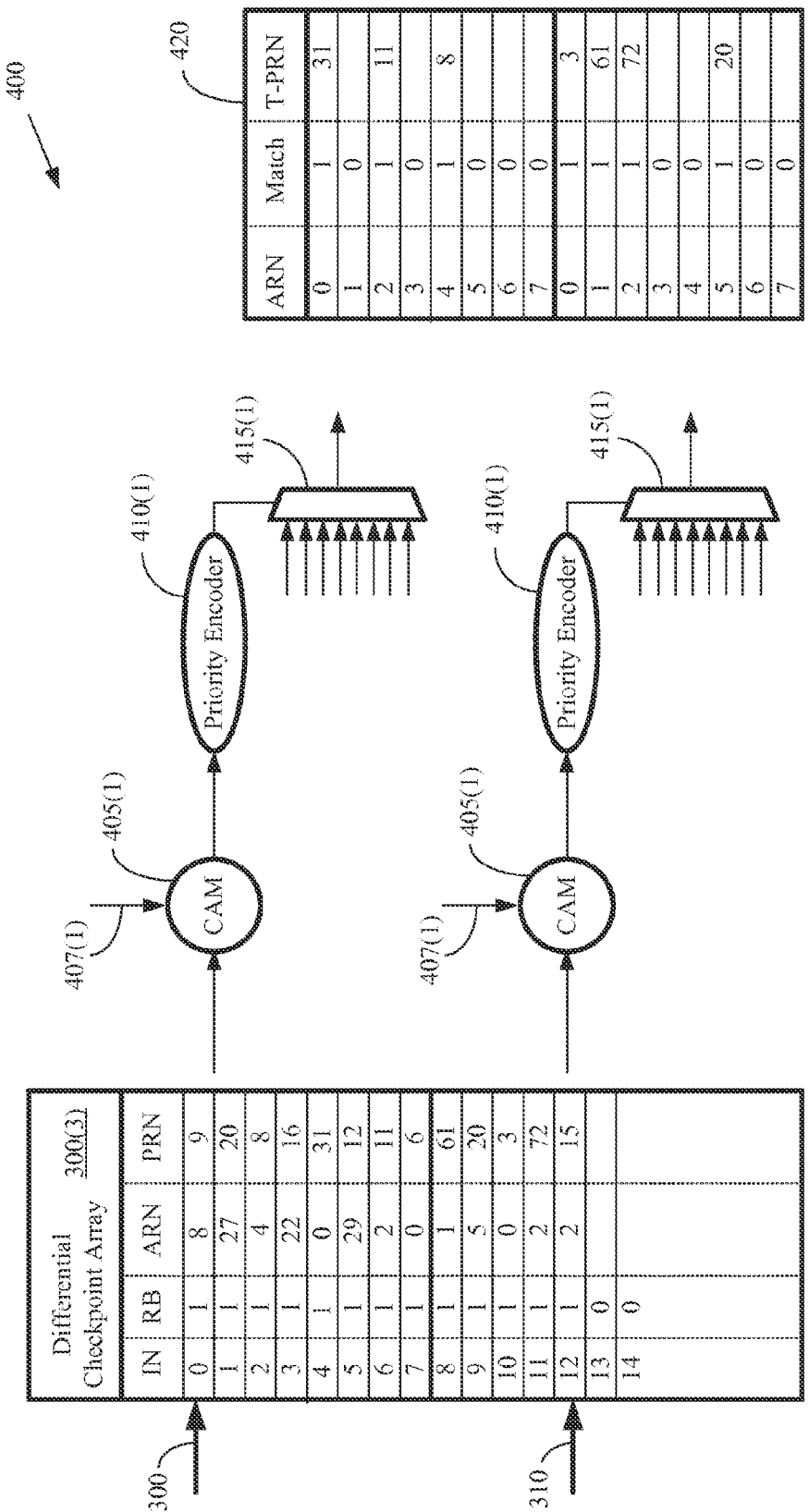
FIG. 4 is a diagram of an example of a first stage of a roll back process that may be implemented in the processor core, according to some embodiments.

FIG. 4 conceptually illustrates an example of a first stage 400 of a roll back process that may be implemented in the processor core 200, according to some embodiments. Some embodiments of the first stage 400 may be implemented as part of an architectural state recovery logic that includes other stages such as the second stage 500 shown in FIG. 5. The rollback process is initiated following dispatch of instruction 12 and so the differential checkpoint array 300(3) represents the changes to the architectural state of the system caused by instructions 0-12. These changes need to be rolled back to return the architectural state of the system to the state prior to branch instruction 0, as indicated by the flush pointer 305, the dispatch pointer 310, and the rollback bits (RB). The first stage 400 includes content addressable memory (CAM) logic 405, priority encoders 410, and multiplexers 415 that can be used to identify the oldest instruction that updated the architectural state of the machine. For example, the first stage 400 may identify the oldest instruction that updated each architectural register number in sets of eight architectural registers. Each set of CAM logic 405, priority encoder 410, and multiplexer 415 may be used to identify the oldest updater instructions in a set of instructions.

The CAM logic 405(1) may be used to identify instructions in the set of instructions 0-7 that modified architectural register numbers 0-7. For example, information identifying the ARNs 0-7 may be provided as input 407(1) to the CAM logic 405(1). The priority encoder 410(1) may identify the oldest instruction that updated each of the architectural registers 0-7 and provide a select signal to the multiplexer 415(1) to write the oldest updating instruction for each architectural register into a temporary array 420. A first portion of the temporary array 420 therefore includes temporary PRNs (T-PRN) for architectural registers 0, 2, and 4 that indicate the PRNs 31, 11, and 8, respectively, because these are the PRNs that were associated with these architectural registers prior to the oldest updating instruction modifying the PRN. Some embodiments of the first stage 400 may use the CAM logic 405(1), priority encoder 410(1), and multiplexer 415(1) to perform the same operations on additional sets of architectural register numbers using different values of the input 407(1) to the CAM logic 405(1).

The CAM logic 405(2) may be used to identify instructions in the set of instructions 8-12 that modified architectural register numbers 0-7. For example, information identifying the ARNs 0-7 may be provided as input 407(2) to the CAM logic 405(2). The priority encoder 410(2) may identify the oldest instruction that updated each of the architectural registers 0-7 and provide a select signal to the multiplexer 415(2) to write the oldest updating instruction for each architectural register into the temporary array 420. A first portion of the temporary array 420 therefore includes temporary PRNs (T-PRN) for architectural registers 0-2 and 5 that indicate the PRNs 3, 61, 72, and 20, respectively, because these are the PRNs that were associated with these architectural registers prior to the oldest updating instruction modifying the PRN. Some embodiments of the first stage 400 may use the CAM logic 405(2), priority encoder 410(2), and multiplexer 415(2) to perform the same operations on additional sets of architectural register numbers using different values of the input 407(2) to the CAM logic 405(2).

Figure 5:
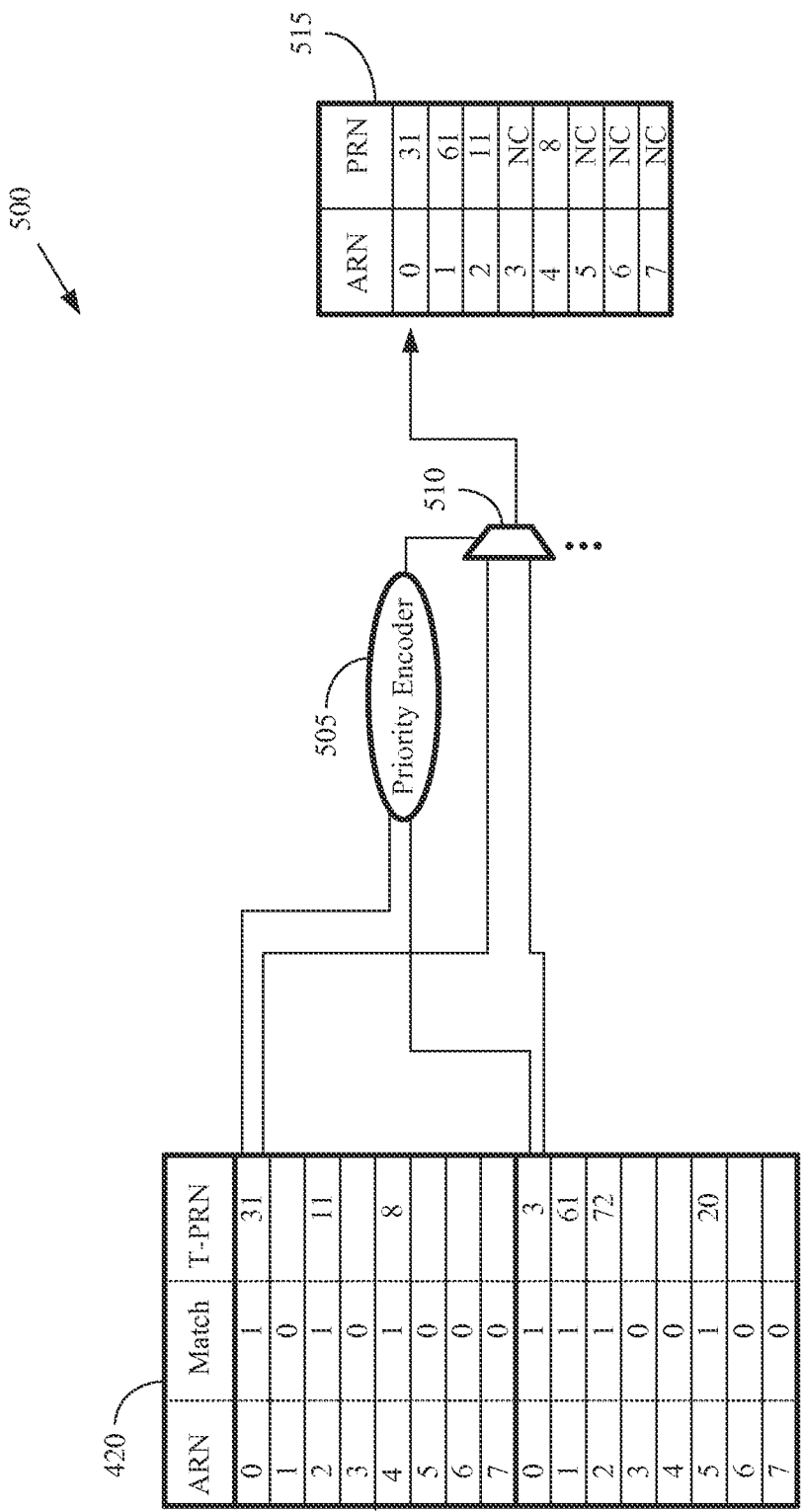
FIG. 5 is a diagram of a second stage of a roll back process that may be implemented in the processor core shown in FIG. 2, according to some embodiments.

FIG. 5 conceptually illustrates an example of a second stage 500 of a roll back process that may be implemented in the processor core 200, according to some embodiments. The second stage 500 includes one or more priority encoders 505 that provide a select signal to one or more multiplexers 510. The priority encoder 505 shown in FIG. 3 receives inputs from entries in the temporary array 420 associated with each ARN. For example, the priority encoder 505 can access information in the entries associated with ARN 0 and then use this information to provide a select signal. Both entries for ARN 0 in the temporary array 420 have information identifying previous associations of the ARN 0 with a PRN, as indicated by a 1 in the Match column. The upper entry is associated with an older instruction than the lower entry and so the priority encoder 505 provides a select signal to the multiplexer 510 to select the value (31) from the upper entry and provide this PRN to a modification array 515. Similar comparisons can be performed for each of the ARN's in the temporary array 420, either by the priority encoder 505 or by other priority encoders and multiplexers (not shown in FIG. 5). These comparisons can be used to populate the modification array 515. Architectural registers that were not changed by any instructions since the previous branch instruction are indicated by NC. The architectural state represented by ARN's 0-7 can then be recovered by modifying the mapping of ARNs 0-2 and 4 to the values indicated in the modification array 515 and leaving the remaining ARNs at their current values.

Figure 6:
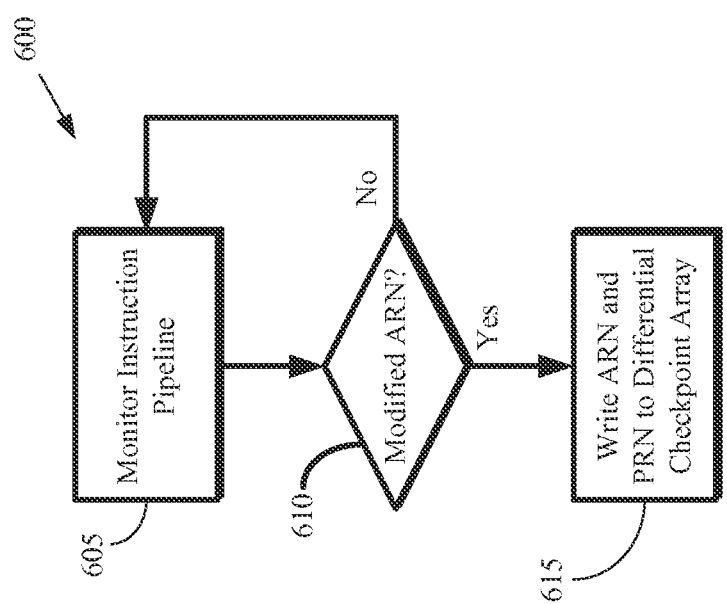
FIG. 6 is a flow diagram of a method of maintaining a differential checkpoint array, according to some embodiments.

FIG. 6 conceptually illustrates a method 600 of maintaining a differential checkpoint array, according to some embodiments. Logic, such as the differential checkpoint unit 228 shown in FIG. 2, monitors (at 605) an instruction pipeline to detect instructions that may modify architectural registers in the machine. As long as the logic determines (at 610) that instructions in the instruction pipeline do not modify an architectural register, the logic may continue to monitor (at 605) the instruction pipeline. When the logic determines (at 610) that an instruction in the instruction pipeline has modified an architectural register, the differential checkpoint array can be updated to indicate the previous association of the modified architectural register with a physical register. For example, the ARN of the modified architectural register and the PRN of the previously associated physical register may be written into a differential checkpoint array such as the differential checkpoint array 300 shown in FIG. 3. A lush pointer, a dispatch pointer, or rollback bits may also be set, as discussed herein.

Figure 7:
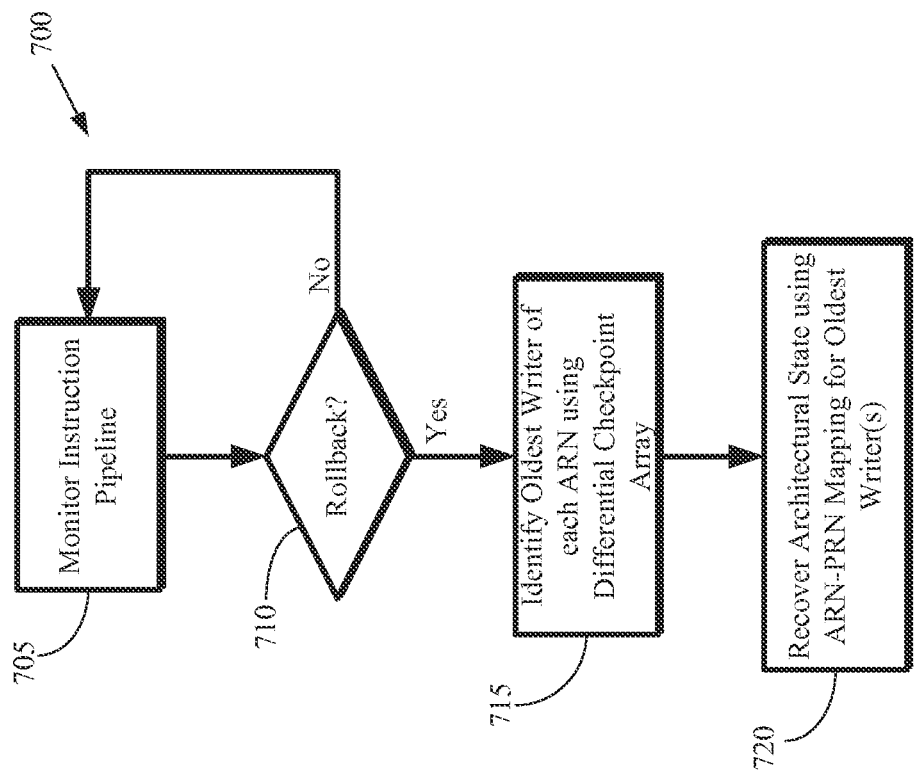
FIG. 7 is a flow diagram a method for rolling back the architectural state of a processing unit such as the processor core shown in FIG. 2, according to some embodiments.

FIG. 7 conceptually illustrates a method 700 for rolling back the architectural state of a processing unit such as the processor core 200 shown in FIG. 2, according to some embodiments. Logic, such as the differential checkpoint unit 228 shown in FIG. 2, monitors (at 705) an instruction pipeline to detect conditions or signal that indicate that the architectural state of the processing unit should be rolled back to a previous state. As long as the logic determines (at 710) that a roll back condition or signal has not been detected, the logic may continue to monitor (at 705) the instruction pipeline. When the logic detects (at 710) a roll back condition or signal, such as a signal indicating that a branch prediction was incorrect and the results of speculative instructions need to be rolled back, the logic may identify (at 715) the oldest updating instruction for each architectural register using a differential checkpoint array, such as the differential checkpoint array 300 shown in FIG. 3. The logic may then recover (at 720) the architectural state of the processing unit using the mapping of ARNs to PRNs for the oldest updating instructions of each architectural register that has been modified, e.g., by speculative instructions following a branch instruction. For example, the mapping of ARNs to PRNs indicated by the current speculative state of the processing unit can be modified by changing the mapping of ARNs to PRNs for the architectural registers that have been modified and leaving the mapping of ARNs to PRNs for the remaining architectural registers unchanged.

Figure 8:
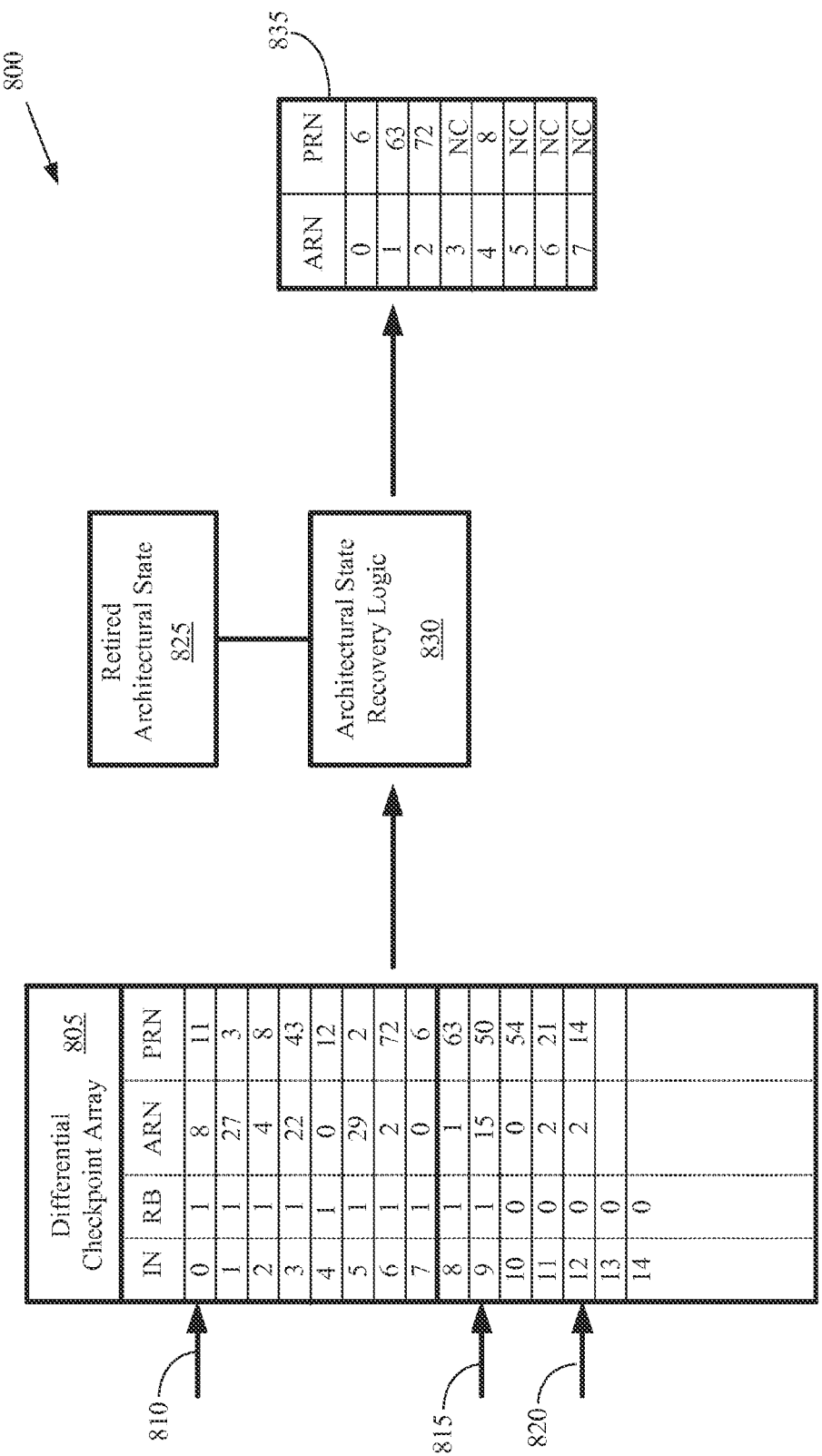
FIG. 8 is a block diagram of a differential checkpoint unit that can be used to roll back the architectural state of a processing unit using a previously retired architectural state as a reference, according to some embodiments.

FIG. 8 conceptually illustrates a differential checkpoint unit 800 that can be used to "roll back" the architectural state of a processing unit from the current speculative state by applying changes indicated in the differential checkpoint unit 800 to a previously retired architectural state, according to some embodiments. The differential checkpoint unit 800 may be implemented as the differential checkpoint unit 228 in some embodiments of the processor core 200 shown in FIG. 2. The differential checkpoint unit 800 includes a differential checkpoint array 805 that stores information indicating the architectural registers (ARN) modified by each instruction (IN) and the physical register (PRN) associated with the ARN following modification by the instruction. A retire pointer 810 is used to indicate the point in the instruction flow at which the architectural state was retired. A flush pointer 815 is used to indicate the location of a branch instruction that begins speculative execution. A dispatch pointer 820 is used to indicate the most recently dispatched instruction. The retired architectural state 825 may be represented by a mapping of ARNs to PRNs for each architectural register supported by the processing unit.

Entries are added to the differential checkpoint array 805 in response to each instruction being dispatched, as discussed herein. However, entries in the differential checkpoint array 805 differ from entries in the differential checkpoint array 300 because the PRN value represents the PRN associated with the ARN after dispatch of the instruction and not prior to dispatch of the instruction. Architectural state recovery logic 830 can therefore be used to roll back the speculative state of the processing unit from the state at instruction 12. (e.g., as indicated by the dispatch pointer 820) to the state at instruction 9 (e.g., as indicated by the flush pointer 815) by "rolling forward" a reference state represented by the retired architectural state 825. The architectural state recovery logic 830 may therefore identify the youngest updating instruction for each architectural register that was changed by instructions that were dispatched between the retire pointer 810 and the flush pointer 815. For example, the architectural state recovery logic 830 may identify instruction 7 as the youngest updater of ARN 0 and may therefore write this information to the modification array 835. Similarly, the architectural state recovery logic 830 may identify instruction 8 as the youngest updating instruction of ARN 1, instruction 6 is the youngest updating instruction of ARN 2, and instruction 2 as the youngest updating instruction of ARN 4. The corresponding values of the PRNs may therefore be written to the modification array 835, which may then be used to recover the architectural state of the processing units prior to the speculative instructions 10-12.

Figure 9:
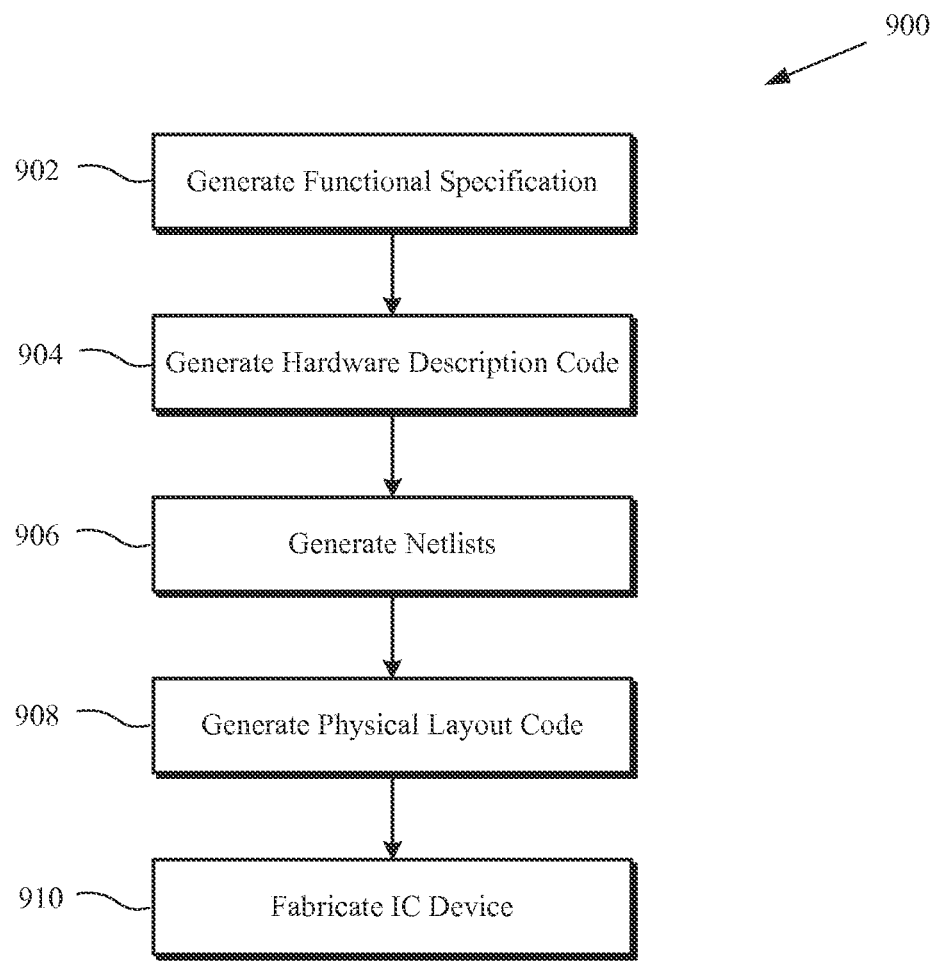
FIG. 9 is a flow diagram illustrating an example method for the design and fabrication of an IC device implementing one or more aspects, according to some embodiments.

FIG. 9 is a flow diagram illustrating an example method 900 for the design and fabrication of an IC device implementing one or more aspects, according to some embodiments. As noted above, the code generated for each of the following processes is stored or otherwise embodied in computer readable storage media for access and use by the corresponding design tool or fabrication tool.

At block 902 a functional specification for the IC device is generated. The functional specification (often referred to as a micro architecture specification (MAS)) may be represented by any of a variety of programming languages or modeling languages, including C, C++, SystemC, Simulink, or MATLAB.

At block 904, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 906 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 908, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 910, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may implemented by one or more processors of a processing system executing software. The software comprises one or more sets of executable instructions stored on a computer readable medium that, when executed by the one or more processors, manipulate the one or more processors to perform one or more aspects of the techniques described above. The software is stored or otherwise tangibly embodied on a computer readable storage medium accessible to the processing system, and can include the instructions and certain data utilized during the execution of the instructions to perform the corresponding aspects. As disclosed herein, in some embodiments a method includes selecting one of a first thread and a second thread for processing at a first stage of an instruction pipeline of Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating," or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   in response to executing an instruction that modifies a mapping of an architectural register to a physical register, storing information indicating the modified mapping of the architectural register in an entry of an array that only includes entries corresponding to architectural registers that have been modified by execution of instructions; and recovering a checkpointed state of a set of architectural registers indicative of a state of the set of architectural registers prior to modification of the architectural register by the instruction by modifying a reference mapping of physical registers to the set of architectural registers using the information stored in the entries of the array.

2. The method of claim 1, wherein storing the information comprises storing information that maps a plurality of physical registers to a corresponding plurality of architectural registers in the set of architectural registers, wherein the information mapping each of the plurality of physical registers to its corresponding architectural register is stored in response to modification of the corresponding architectural register by a corresponding instruction.

3. The method of claim 2, wherein storing the information comprises storing information mapping each of the plurality of physical registers to a corresponding architectural register of the plurality of architectural registers in response to modification of the corresponding architectural register by instructions that are executed speculatively following a branch instruction.

4. The method of claim 3, wherein recovering the checkpointed state of the set of architectural registers comprises recovering a checkpointed state of the set of architectural registers indicative of the state of the set of architectural registers after execution of the branch instruction.

5. The method of claim 1, wherein the reference mapping comprises a mapping of the physical registers to the set of architectural registers following modification of the mapping of the architectural register from a first physical register to a second physical register by the instruction, and wherein storing the information comprises storing information identifying the architectural register and the first physical register without storing information identifying the second physical register.

6. The method of claim 5, wherein recovering the checkpointed state of the set of architectural registers comprises modifying the reference mapping of the physical registers to the set of architectural registers using an oldest modification of each of the architectural registers in entries of the array.

7. The method of claim 1, wherein the reference mapping comprises a mapping of the physical registers to the set of architectural registers prior to modification of the mapping of the architectural register from a first physical register to a second physical register by the instruction, and wherein storing the information that maps the physical register to the architectural register comprises storing information identifying the architectural register and the second physical register without storing information identifying the first physical register.

8. The method of claim 7, wherein recovering the checkpointed state of the set of architectural registers comprises modifying the reference mapping of the physical registers to the set of architectural registers using a youngest modification of each of the architectural registers in entries of the array.

9. A method, comprising:
recovering a checkpointed state of a set of architectural registers indicative of a state of the set of architectural registers prior to at least one instruction modifying at least one architectural register in the set of architectural registers by modifying a reference mapping of physical registers to the set of architectural registers using only entries of an array that include information that maps said at least one modified architectural register to at least one physical register, wherein the array only includes entries corresponding to architectural registers that have been modified by execution of instructions.

10. The method of claim 9, wherein the reference mapping comprises a mapping of the physical registers to the set of architectural registers following modification of said at least one architectural register by said at least one instruction, and wherein the reference mapping is modified using information that maps said at least one modified architectural register to at least one physical register prior to modification of said at least one architectural register by said at least one instruction.

11. The method of claim 10, wherein recovering the checkpointed state of the set of architectural registers comprises modifying the reference mapping of the physical registers to the set of architectural registers using an oldest modification of the at least one modified architectural register indicated by entries in the array.

12. The method of claim 9, wherein the reference mapping comprises a mapping of the physical registers to the set of architectural registers prior to modification of the architectural register by said at least one instruction, and wherein the reference mapping is modified using information that maps said at least one modified architectural register to at least one physical register after modification of said at least one architectural register by said at least one instruction.

13. The method of claim 12, wherein recovering the checkpointed state of the set of architectural registers comprises modifying the reference mapping of the physical registers to the set of architectural registers using a youngest modification of the at least one modified architectural register indicated by entries in the array.

14. An apparatus, comprising:
an array to store information that maps a physical register to an architectural register in response to an instruction modifying the architectural register, wherein the array is configured to only include entries corresponding to architectural registers that have been modified by execution of instructions; and
logic to recover a checkpointed state of a set of architectural registers indicative of a state of the set of architectural registers prior to modification of the architectural register by the instruction by modifying a reference mapping of physical registers to the set of architectural registers using the information stored in entries in the array.

15. The apparatus of claim 14, wherein the array is configured to store information that maps a plurality of physical registers to a corresponding plurality of architectural registers in the set of architectural registers, wherein the information mapping each of the plurality of physical registers to its corresponding architectural register is stored in the array in response to modification of the corresponding architectural register by a corresponding instruction.

16. The apparatus of claim 15, wherein the array is configured to store information mapping each of the plurality of physical registers to its corresponding architectural register in response to modification of the corresponding architectural register by instructions that are executed speculatively following a branch instruction.

17. The apparatus of claim 16, wherein the logic is configured to recover a checkpointed state of the set of architectural registers after execution of the branch instruction.

18. The apparatus of claim 14, wherein the reference mapping comprises a mapping of the physical registers to the set of architectural registers following modification of the architectural register by the instruction, and wherein the array is configured to store a mapping of the physical register to the architectural register prior to modification of the architectural register by the instruction.

19. The apparatus of claim 18, wherein the logic is configured to modify the reference mapping of the physical registers to the set of architectural registers using an oldest modification of each of the architectural registers in entries in the array.

20. The apparatus of claim 14, wherein the reference mapping comprises a mapping of the physical registers to the set of architectural registers prior to modification of the architectural register by the instruction, and wherein the array is configured to store a mapping of the physical register to the architectural register after modification of the architectural register by the instruction, and wherein the logic is configured to modify the reference mapping of the physical registers to the set of architectural registers using a youngest modification of architectural registers in entries in the array.

* * * * *